(12) United States Patent
Cray

(10) Patent No.: US 8,873,340 B1
(45) Date of Patent: Oct. 28, 2014

(54) HIGHLY DIRECTIVE ARRAY APERTURE

(71) Applicant: Benjamin A. Cray, West Kingston, RI (US)

(72) Inventor: Benjamin A. Cray, West Kingston, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 157 days.

(21) Appl. No.: 13/765,883

(22) Filed: Feb. 13, 2013

(51) Int. Cl.
*G01S 3/802* (2006.01)
*H04R 31/00* (2006.01)

(52) U.S. Cl.
CPC .............. *G01S 3/802* (2013.01); *H04R 31/006* (2013.01)
USPC .......................................................... 367/138

(58) Field of Classification Search
CPC ................................ G01S 3/802; H04R 31/00
USPC ............. 367/138, 173, 188, 165, 129; 29/594
See application file for complete search history.

(56) References Cited

U.S. PATENT DOCUMENTS

| | | | | |
|---|---|---|---|---|
| 5,442,594 A | * | 8/1995 | Cray | 367/162 |
| 5,808,970 A | * | 9/1998 | Nussbaum et al. | 367/153 |
| 5,940,347 A | * | 8/1999 | Raida et al. | 367/138 |
| 6,262,944 B1 | * | 7/2001 | Meyer et al. | 367/154 |
| 7,206,258 B1 | * | 4/2007 | Fisher et al. | 367/141 |
| 7,536,913 B2 | * | 5/2009 | Naluai et al. | 73/633 |
| 7,633,206 B2 | * | 12/2009 | Andle et al. | 310/313 D |

* cited by examiner

*Primary Examiner* — Daniel Pihulic
(74) *Attorney, Agent, or Firm* — James M. Kasischke; Michael P. Stanley

(57) ABSTRACT

An apparatus and method is provided that utilizes sonar array discontinuities for increasing the directivity gain of a sonar system by increasing the ratio of trace wavelengths (replicated) to the length of a fixed array aperture. Impedance discontinuities, or blocking masses, are embedded in a matrix material of fixed length to create Bragg scattered longitudinal displacements of a wavelength. The longitudinal displacements are induced by an incident acoustic plane wave. This creates longitudinal replicas of the displacements, shifted in wave number, creating a scaled acoustic trace wavelength. The replicated trace wavelength is sampled and resolved, thereby increasing the directivity gain of a sonar system.

17 Claims, 2 Drawing Sheets

HIGHLY DIRECTIVE ARRAY APERTURE

STATEMENT OF GOVERNMENT INTEREST

The invention described herein may be manufactured and used by or for the Government of the United States of America for governmental purposes without the payment of any royalties thereon or therefore.

CROSS REFERENCE TO OTHER PATENT APPLICATIONS

None.

BACKGROUND OF THE INVENTION (1) Field of the Invention

The invention relates generally to sonar arrays with acoustic discontinuities, and, more particularly, to increasing the directivity gain of a sonar array aperture by measuring particle motion of Bragg scattered longitudinal waves induced in the array as a result of incident waves that encounter the array.

(2) Description of the Prior Art

It is often desirable to determine the direction from which an acoustic signal arrives with as much accuracy as possible. Accordingly, increased gain in array directivity, especially at very low frequencies, is desired and sought by sonar designers.

The following patents and publication show various types of acoustic arrays with coatings and discontinuities that have been utilized in the past to solve various problems.

U.S. Pat. No. 5,808,970, to Nussbaum, et al., issued Sep. 15, 1998, discloses a sonar array uses multiple acoustically transparent layers. One layer is a linear array of acoustic sensors that is substantially acoustically transparent. Another layer is an acoustically transparent wiring assembly that provides electrical connection to each acoustic sensor. A third acoustically transparent layer is a planar array of signal processing circuits coupled to the wiring assembly for processing electrical signals generated by the acoustic sensors. Each signal processing circuit resides within an area that is in geometric correspondence with a respective one acoustic sensor. Each signal processing circuit can include a preamplifier, an analog-to-digital converter and a digital multiplexer.

U.S. Pat. No. 6,262,944, to Meyer, et al., issued Jul. 17, 2001, discloses an acoustic array including a plurality of acoustic sensors positioned at predetermined telemetry points for measuring the acoustic energy from the surrounding environment. The acoustic sensors are each positioned within a fluid-filled pocket in the acoustic array, wherein each the various fluid-filled pockets are separated from each other by a section of solid fill buoyant material. The sections of solid fill material control the buoyancy of the acoustic array. The acoustic array is surrounded by a longitudinally extending outer hosewall which encloses the acoustic array and forms the fluid-filled pockets between the sections of solid fill material. A strength member is extended longitudinally throughout the length of the acoustic array to provide a load bearing mechanism for distributing longitudinal tensile loads applied to the acoustic array, while support spacers are situated within the acoustic array to provide radial support for the acoustic array. The acoustic array is formed of a lightweight and electrically passive structure which allows water to be used as the fill fluid for the pockets. Using water as the fill fluid provides an environmentally-safe fill fluid having buoyancy characteristics which are not significantly altered by its mixture with water from the surrounding environment should a rupture in the hosewall occur.

U.S. Pat. No. 7,206,258, to Fisher, et al., issued Apr. 17, 2007, discloses an array of pressure sensors and motion sensors contained in a layered material system that includes an acoustically compliant layer and an acoustically transparent layer. The compliant layer (which vibrates in accordance with acoustical influence thereupon) is the foundation for both sensor types and is the vibratory medium for motion sensing. The transparent layer is the matrix for both sensor types and is the window permitting sound waves to reach the pressure sensors (which sense pressure of the sound waves) and the compliant layer (the vibration of which is sensed by the motion sensors). The compliant layer's exposed surface can be attached to a structure's exterior for passive sonar detection purposes. Since the pressure sensors are effective primarily for low frequency sound waves, and the motion sensors are effective primarily for high frequency sound waves, the invention is aggregately effective for a broad band spanning low and high frequencies.

U.S. Pat. No. 7,536,913, to Naluai, et al., issued May 26, 2009, discloses an underwater acoustic sensor designed for attachment to a rigid or semi-rigid mounting structure. The sensor includes an outer casing and a secondary casing spaced therefrom. A compliance layer is disposed between the inner surface of the outer casing and the outer surface of the secondary casing. An inner sensor support is designed to attach to the mounting structure and is spaced from the inner surface of the secondary casing. A plurality of sensor elements are disposed between and interconnect the inner surface of the secondary casing and the sensor support.

U.S. Pat. No. 7,633,206, to Andle, et al., issued Dec. 15, 2009, discloses reflective and slanted array channelized sensor arrays having a broadband source providing acoustic energy to a reflective or slanted array that reflects a portion of the incident signal to one or more sensing films wherein the response is measured.

The above patents and publications do not show discontinuities formed in the array that create replica waves having smaller wavelengths that are used to increase the directivity of the array. Those of skill will appreciate the present invention which provides improved directivity of a sonar array.

SUMMARY OF THE INVENTION

It is an object of the present invention to provide an array for sonar systems having improved directivity.

Another object of the present invention is to provide a sonar system capable of shifting and physically reducing the spatial period of an acoustic trace wavelength.

Other objects and advantages of the present invention will become apparent from the following descriptions, taken in connection with the accompanying drawings, wherein, by way of illustration and example, an embodiment of the present invention is disclosed. However, it will be understood that the present invention is not limited to the above and/or other objects of the invention.

In accordance with one embodiment, the present disclosure provides a method for making a sonar array with high directivity. The sonar array is provided with a coating material in which the acoustic wave induces a longitudinal wave along a length of the coating material. A plurality of blocking members are positioned in the coating material operable to interfere with the longitudinal wave to create smaller replica waves between the blocking members. A plurality of sensors are provided between the blocking members. These sensors are operable to detect particle motion of the replica waves between the blocking members. A signal processor is operatively coupled to signal processor to the plurality of sensors. The signal processor can utilize measurements of the particle motion to determine an incident angle of the acoustic wave. In one embodiment, the plurality of sensors can be operable to detect particle motion in a direction perpendicular to a normal of the sonar array.

The method may further include spacing the blocking masses periodically within the coating material. The blocking masses can be substantially planar members oriented to be parallel to a normal of the sonar array. The blocking masses can also extend through the coating. The provided blocking masses can have a width much smaller than a length of the sonar array and the blocking mass material can be have a different acoustic impedance than the coating material. The coating material can have an acoustic impedance similar to the operating environment acoustic impedance.

In accordance with another embodiment of the present invention, a sonar array for receiving an acoustic wave in an operating environment is disclosed. The sonar array includes a coating in which the acoustic wave induces a longitudinal wave along a length of the coating. The coating is composed primarily of a coating material having a plurality of blocking members positioned therein. The blocking members interfere with the longitudinal wave. A plurality of sensors are positioned in the coating material between the blocking members. These sensors can detect particle motion between the blocking members. A signal processor coupled to the sensors utilizes measurements of particle motion to determine an incident angle of the acoustic wave. The sensors may be operable to detect particle motion in a direction perpendicular to a normal of the sonar array. In one embodiment, the blocking masses are spaced periodically within the coating material. The blocking masses can also be substantially planar members oriented to be parallel to a normal of the sonar array and extend through the coating. The blocking masses can have a width much smaller than a length of the sonar array and can be more rigid, or compliant, than the coating material. The coating material can have an acoustic impedance similar to the operating environment acoustic impedance. The coating may be a polymeric material.

DETAILED DESCRIPTION OF THE INVENTION

The present invention detects characteristics of acoustic wave propagation within a coating containing periodic, or non-periodic, impedance discontinuities (or blocking masses). As discussed in more detail subsequently, a coating refers to a finite layer of material, such as polyurethane, which separates sonar array elements from the external environment. Coatings, such as acoustic windows, acoustic baffles, and outer decouplers, can be used to enhance acoustic signals, maintain array element positional tolerances, and prevent element damage.

Figure 1:
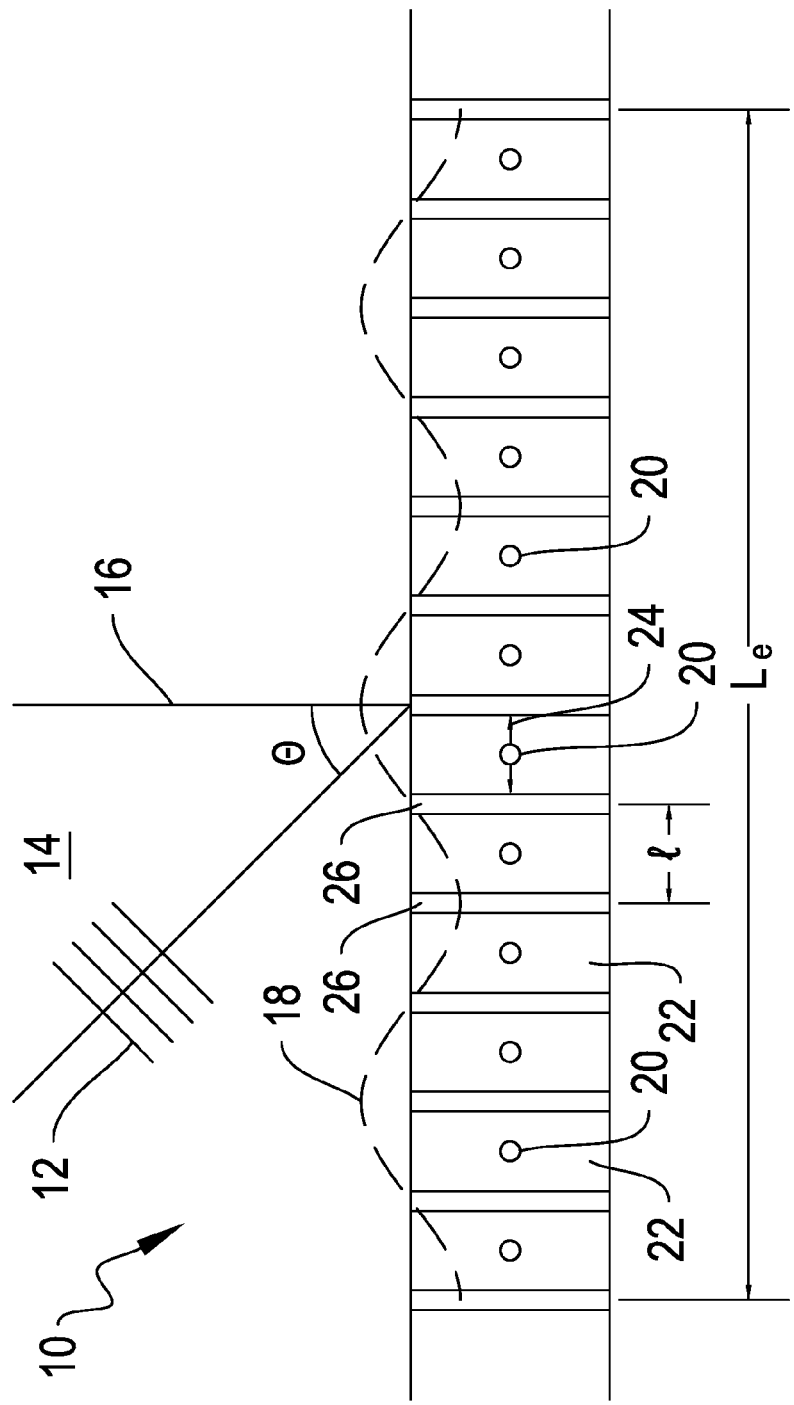
FIG. 1 is a schematic diagram which illustrates an array of vector sensors subjected to an incident acoustic plane wave traveling through a medium in accord with one possible embodiment of the invention.

Referring now to the drawings, FIG. 1 shows vector sensor array 10 subjected to an incident acoustic plane wave 12 traveling through medium 14. Incident acoustic plane wave 12 has an amplitude $P_0$. Medium 14 has a density $\rho_0$ and a speed of sound $c_0$. Plane wave 12 makes an incident angle $\theta$ with respect to a normal 16 to vector sensor array 10. When it impinges on vector sensor array 10, acoustic plane wave 12 induces longitudinal wave 18 in vector sensor array 10.

Vector sensor array 10 includes plurality of sensors 20 positioned in a matrix 22. In one possible embodiment, matrix 22 is preferably made from a polymeric material, although matrix 22 could be composed of other materials which perform as described herein. Vector sensor array 10 has an aperture length given by $L_e$. Matrix 22 has a density $\rho_1$ and a speed of sound $c_1$. A plurality of sensors 20 are capable of detecting longitudinal waves produced in matrix 22.

Preferably, plurality of sensors 20 are velocity vector sensors which are capable of detecting velocity in the direction shown by arrows 24, which are perpendicular to normal 16. However, more generally, plurality of sensors 20 can measure any type of particle motion within the matrix due to longitudinal waves, including, but not limited to displacement, velocity, and acceleration. In one possible preferred embodiment, matrix 22 would have acoustic impedance similar to that of the operating environment 14.

Impedance discontinuities, or blocking masses 26 are positioned in matrix 22 at preset intervals between each sensor 20. As indicated in the figures, the blocking masses 26 can be relatively thin in the longitudinal as compared to the longitudinal length of the array. Blocking masses 26 can have a minimal width as long as they present a sufficiently different impedance to reflect longitudinal waves. This occurs when either the densities of the materials are different or the elasticities are different. A greater acoustic impedance difference provides a more efficient reflection; however, a sufficient reflection is achieved utilizing a polymer matrix and metallic blocking masses. The blocking masses 26 may extend completely through matrix 22 and may be oriented parallel to normal 16 of the array, which is perpendicular to longitudinal wave 18. The blocking masses 26 can be planar elements of a uniform size. As shown, the centers of masses 26 are separated from each other by a periodic separation distance 1. However, the invention is not limited to regular intervals and may comprise other intervals, groups or sections of intervals, or the like. Blocking masses 26 can be any material causing a periodic discontinuity that interferes with longitudinal wave 18. This material can be a more rigid polymeric material or a highly rigid, relatively thin, material such as a metallic material. The material comprising blocking mass 26 has a density given by $\rho_2$. Pass and stop band behaviors of array 10 are controlled by the material properties of blocking masses 26. The periodic positioning of blocking masses 26 scatters longitudinal wave 18 into repeating smaller longitudinal wave replicas of longitudinal wave 18.

Figure 2:
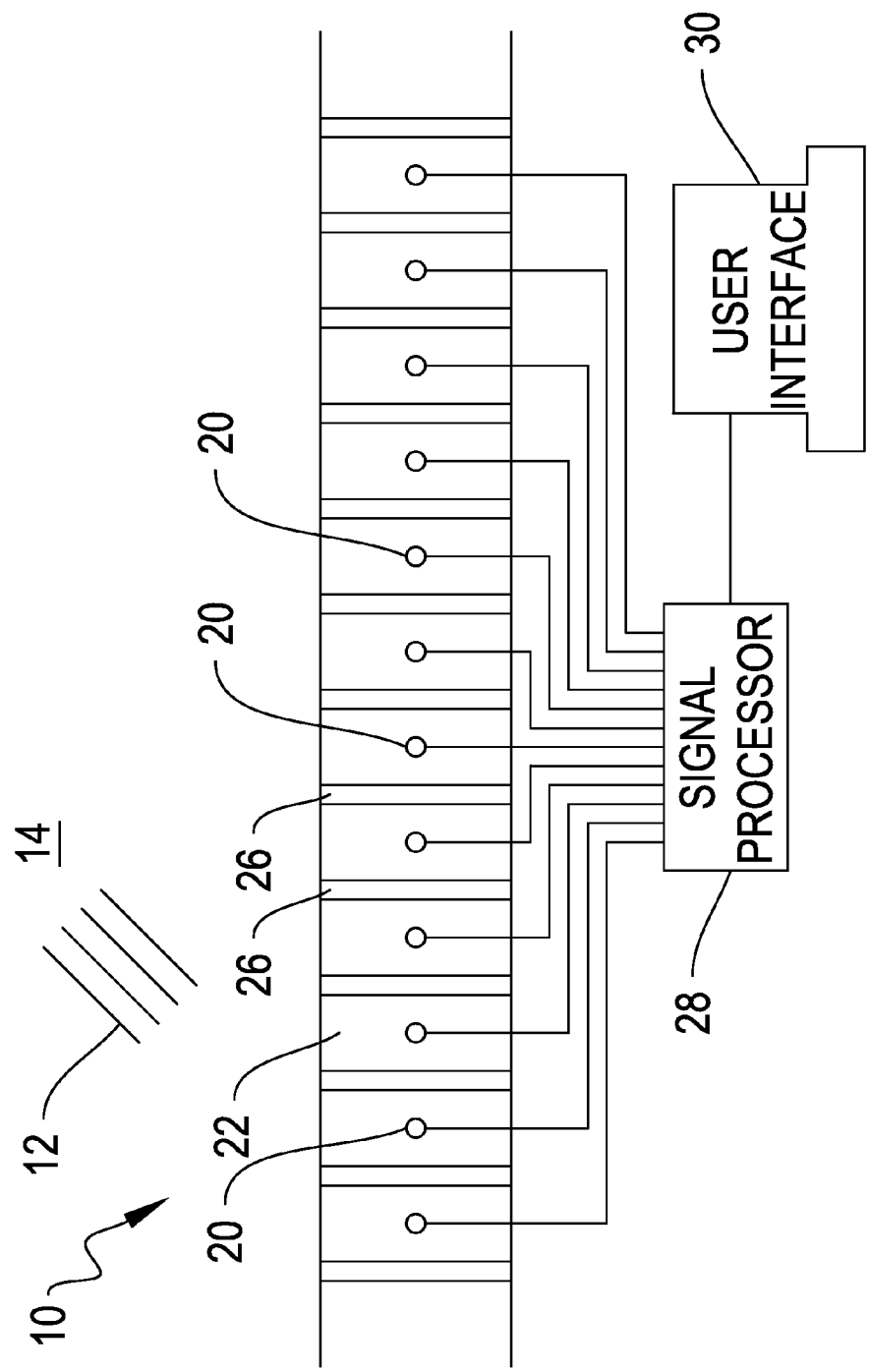
FIG. 2 is a schematic diagram which illustrates an array joined to signal processing circuitry for calculation of parameters related to incident plane wave in accord with one possible embodiment of the present invention.

FIG. 2 shows vector sensor array 10 joined to signal processing circuitry 28 for calculation of parameters related to incident plane wave 12. Vector sensor array 10 is joined to signal processing circuitry 28 so that positional measurements from each sensor 20 can be processed separately. By analyzing the scattered data at each of plurality of sensors 20, it becomes possible to determine the incident angle $\theta$ and the bearing to the acoustic source with increased accuracy. Incident angle $\theta$ and other information about the array data can be provided to user interface 30 or to any alternative system for further analysis.

The incident angle $\theta$ is obtained using conventional beamforming. Longitudinal wavelength 18 is scattered utilizing Bragg scattering due to blocking masses 26 and creates longitudinal wavelength replicas in the direction of arrows 24. These longitudinal wavelength replicas have a smaller wavelength as compared with the original longitudinal wavelength 18. Without blocking masses 26, vector sensor array 10 could only sample wavelength 18, and performance would be limited by the Nyquist sampling theorem, providing for less accurate performance.

For example, across the length $L_e$, there may be only about two longitudinal original wavelengths 18, as suggested in FIG. 1. When blocking masses 26 are added to matrix 22, longitudinal wavelengths 18 remain. However, additional longitudinal wavelength replicas are also created, which are smaller in comparison to longitudinal wavelength 18. The wavelength of longitudinal wavelength replicas depends on element length l and density of blocking masses 26.

In the non-limiting example of the configuration shown, blocking masses 26 create around ten longitudinal wavelength replicas over array aperture length $L_e$. Sensors 20 can measure the particle motion associated with each of these longitudinal wavelength replicas. Measuring more wavelengths of longitudinal wavelength replicas 18A, within a given length $L_e$, increases the directivity of vector sensor array 10 as compared to measuring wavelength 18, meaning that vector sensor array 10 provides a better estimate of arrival angle θ.

Blocking masses 26 preserve the angular dependence of longitudinal wavelength 18, or incident trace wavelength, and arrival angle θ. One possible example of beamforming as described hereinafter can be used to determine a maximum response angle for longitudinal wavelength 18.

In order to determine incident angle, $θ_1$, the following procedure can be used. The trace wave number, $k_t$, is expressed as:

$$k_t = A * \sin(θ_1) \quad (1)$$

with A being a constant value. A conventional beamformer essentially looks for a maximum, that is, when does $θ_1 = θ_n$, where n=0, 1, 2, etc. When:

$$e^{A*\sin(θ_1) - A*\sin(θ_n)} = 1, \quad (2)$$

then all the acoustic energy is arriving at direction $θ_1$. Circular ambiguity is resolved because plurality of sensors 20 measures a vector quantity with positive numbers along one direction of an axis and negative numbers along another.

In summary, the present invention utilizes acoustic impedance discontinuities to increase the directivity of an array by essentially increasing the ratio of the number of replicated wavelengths to the length of a fixed array aperture. The discontinuities are preferably periodic repeating blocking masses, or impedance discontinuities, embedded in a polyurethane material, or similar matrix of fixed length. The longitudinal displacements, excited and induced by an incident acoustic plane wave, are Bragg-shifted in wave number, thus creating a scaled acoustic trace wavelength. The replicated trace wavelength is appropriately sampled and resolved, increasing the directivity of the sonar system.

It will be understood that many additional changes in the details, materials, steps and arrangement of parts, which have been herein described and illustrated in order to explain the nature of the invention, may be made by those skilled in the art within the principle and scope of the invention as expressed in the appended claims.

The foregoing description of the preferred embodiments of the invention has been presented for purposes of illustration and description only. It is not intended to be exhaustive or to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. A method for making a sonar array with high directivity for receiving an acoustic wave in an operating environment comprising:
   providing a matrix material in which said acoustic wave induces a longitudinal wave along a length of the array;
   positioning a plurality of blocking members in said matrix material operable to interfere with said longitudinal wave to create smaller replica waves between said blocking members;
   positioning a plurality of sensors in said matrix material between said blocking members operable to detect particle motion of said replica waves between said blocking members;
   coupling a signal processor to said plurality of sensors; and
   utilizing said signal processor and said detected particle motion to determine an incident angle of the acoustic wave.

2. The method of claim 1 further comprising providing that said plurality of sensors are operable to detect particle motion in a direction perpendicular to a normal of the sonar array.

3. The method of claim 1 wherein said step of positioning said plurality of blocking masses comprises positioning said plurality of blocking masses periodically within said matrix material.

4. The method of claim 3 wherein said step of positioning said plurality of blocking masses further comprises providing that said blocking masses are substantially planar members oriented to be parallel to a normal of said sonar array and further providing that said blocking masses extend through said matrix material.

5. The method of claim 3 wherein said step of positioning said plurality of blocking masses further comprises providing that said blocking masses have a higher density than said matrix material.

6. The method of claim 3 wherein said step of positioning said plurality of blocking masses further comprises providing that said blocking masses are more rigid than said matrix material.

7. The method of claim 1 wherein said step of providing a matrix material further comprises providing said matrix material has an acoustic impedance similar to said operating environment acoustic impedance.

8. The method of claim 1 wherein said step of providing a matrix material further comprises providing that said matrix material is a polymeric material.

9. The method of claim 1 wherein said step of utilizing said signal processor includes utilizing beamforming to determine said incident angle of said acoustic wave.

10. A sonar array for receiving an acoustic wave in an operating environment comprising:
    a matrix material in which the received acoustic wave is capable of inducing a longitudinal wave along a length of said matrix material;
    a plurality of blocking members positioned in said matrix material wherein said blocking members are capable of interfering with the longitudinal wave;
    a plurality of sensors positioned in said matrix material between said blocking members capable of detecting particle motion between said blocking members; and a signal processor coupled to said plurality of sensors capable of utilizing measurements of said particle motion to determine an incident angle of the received acoustic wave.

11. The sonar array of claim 10 wherein said plurality of sensors are operable to detect particle motion in a direction perpendicular to a normal of said sonar array.

12. The sonar array of claim 10 wherein said blocking masses are spaced periodically within said matrix material.

13. The sonar array of claim 11 wherein said blocking masses are substantially planar members oriented to be parallel to a normal of said sonar array and extend through said matrix material.

14. The sonar array of claim 11 wherein said blocking masses are made from a material denser than said matrix material.

15. The sonar array of claim 11 wherein said blocking masses are made from a material that is more rigid than said matrix material.

16. The sonar array of claim 10 wherein said matrix material has an acoustic impedance similar to that of said operating environment.

17. The sonar array of claim 10 wherein said matrix material is a polymeric material.

* * * * *